United States Patent
Hirai

(10) Patent No.: US 9,814,052 B2
(45) Date of Patent: Nov. 7, 2017

(54) DATA DISTRIBUTION SYSTEM, DISTRIBUTION DEVICE, TERMINAL DEVICE, AND DATA DISTRIBUTION METHOD PROVIDING ENHANCED COMMUNICATION EFFICIENCY

(71) Applicant: MITSUBISHI ELECTRIC CORPORATION, Chiyoda-ku (JP)

(72) Inventor: Hiroaki Hirai, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 162 days.

(21) Appl. No.: 14/652,522

(22) PCT Filed: Jun. 4, 2013

(86) PCT No.: PCT/JP2013/065465
§ 371 (c)(1),
(2) Date: Jun. 16, 2015

(87) PCT Pub. No.: WO2014/057709
PCT Pub. Date: Apr. 17, 2014

(65) Prior Publication Data
US 2016/0021668 A1    Jan. 21, 2016

(30) Foreign Application Priority Data
Feb. 14, 2013   (JP) ................. 2013-026887

(51) Int. Cl.
*H04L 1/00*      (2006.01)
*H04W 72/06*     (2009.01)
(Continued)

(52) U.S. Cl.
CPC ............. *H04W 72/06* (2013.01); *H04W 4/06* (2013.01); *H04W 24/08* (2013.01);
(Continued)

(58) Field of Classification Search
CPC ....... H04W 4/06; H04W 24/08; H04W 72/06; H04W 84/18; H04W 88/04; H04W 40/02; H04L 45/122; H04L 45/70; H04L 45/245
See application file for complete search history.

(56) References Cited

U.S. PATENT DOCUMENTS 7,619,998 B2 * 11/2009 Takeda ................. H04L 45/302
                                                              370/312
2005/0152293 A1   7/2005 Nanda et al.
(Continued)

FOREIGN PATENT DOCUMENTS

JP    2000-324155 A    11/2000
JP    2002-320249 A    10/2002
(Continued)

OTHER PUBLICATIONS

Atsushi Iwata, et al., "Scalable Routing Strategies for Ad Hoc Wireless Networks," IEEE Journal on Selected Areas in Communications, Aug. 1999, vol. 17, No. 8, pp. 1369-1379.
(Continued)

*Primary Examiner* — Ayaz Sheikh
*Assistant Examiner* — Hai-Chang Hsiung
(74) *Attorney, Agent, or Firm* — Oblon, McClelland, Maier & Neustadt, L.L.P.

(57) ABSTRACT

A data distribution server and terminals measure a communication status with other devices. Based on measurement results of the communication status, the data distribution server categorizes the terminals as "trunk" or "branch", notifies the terminals of categorization results, notifies the terminals of selection of a relay path through which data can be distributed to all relay terminals by relaying the data between "trunks", and instructs a "trunk" terminal to relay the data through the relay path. When notified that the terminal itself is a "trunk", each of the terminals relays the data based on an instruction from the data distribution
(Continued)

server. When notified by the data distribution server that the terminal itself is a "branch", each of the terminals receives the data distributed from the data distribution server or the "trunk".

15 Claims, 8 Drawing Sheets

(51) Int. Cl.
*H04W 4/06* (2009.01)
*H04W 24/08* (2009.01)
*H04W 84/18* (2009.01)
*H04W 88/04* (2009.01)
*H04W 40/02* (2009.01)
*H04L 12/733* (2013.01)
*H04L 12/709* (2013.01)
*H04L 12/721* (2013.01)

(52) U.S. Cl.
CPC .......... *H04L 45/122* (2013.01); *H04L 45/245* (2013.01); *H04L 45/70* (2013.01); *H04W 40/02* (2013.01); *H04W 84/18* (2013.01); *H04W 88/04* (2013.01)

(56) References Cited

U.S. PATENT DOCUMENTS

| | | | | |
|---|---|---|---|---|
| 2007/0263592 | A1* | 11/2007 | Agarwal | H04L 45/02 370/351 |
| 2009/0201848 | A1* | 8/2009 | Kumazawa | H04W 80/04 370/328 |
| 2010/0265951 | A1* | 10/2010 | Fujita | H04L 45/12 370/392 |
| 2011/0225311 | A1* | 9/2011 | Liu | H04L 45/125 709/231 |
| 2012/0155329 | A1* | 6/2012 | Shaffer | H04L 45/023 370/255 |

FOREIGN PATENT DOCUMENTS

| | | |
|---|---|---|
| JP | 2007-518354 A | 7/2007 |
| JP | 2007-251811 A | 9/2007 |
| JP | 2010-263349 A | 11/2010 |
| JP | 2011-146866 A | 7/2011 |

OTHER PUBLICATIONS

International Search Report dated Jul. 16, 2013 in PCT/JP2013/065465 filed Jun. 4, 2013.

\* cited by examiner

FIG.5

|  | X COORDINATE | Y COORDINATE |
|---|---|---|
| N1 | 2 | 0 |
| N2 | 13 | 0 |
| N3 | 24 | 0 |
| N4 | 35 | 0 |
| N5 | 46 | 0 |
| N6 | 0 | 7 |
| N7 | 11 | 7 |
| N8 | 22 | 7 |
| N9 | 33 | 7 |
| N10 | 44 | 7 |
| N11 | 2 | 14 |
| N12 | 13 | 14 |
| N13 | 24 | 14 |
| N14 | 35 | 14 |
| N15 | 46 | 14 |
| SERVER | 0 | 21 |
| N16 | 11 | 21 |
| N17 | 22 | 21 |
| N18 | 33 | 21 |
| N19 | 44 | 21 |

FIG.6

| | N1 | N2 | N3 | N4 | N5 | N6 | N7 | N8 | N9 | N10 | N11 | N12 | N13 | N14 | N15 | SERVER | N16 | N17 | N18 | N19 |
|---|---|---|---|---|---|---|---|---|---|---|---|---|---|---|---|---|---|---|---|---|
| N1 | - | -66.035 | -73.561 | -77.963 | -81.086 | -61.553 | -66.424 | -73.153 | -77.554 | -80.73 | -68.653 | -71.263 | -75.406 | -78.861 | -81.61 | -73.105 | -73.971 | -76.56 | -79.334 | -81.793 |
| N2 | -66.035 | - | -66.035 | -73.561 | -77.963 | -69.231 | -61.553 | -66.424 | -73.153 | -77.554 | -71.263 | -68.653 | -71.263 | -75.406 | -78.861 | -74.817 | -73.105 | -73.971 | -76.56 | -79.334 |
| N3 | -73.561 | -66.035 | - | -66.035 | -73.561 | -74.949 | -69.231 | -61.553 | -66.424 | -73.153 | -75.406 | -71.263 | -68.653 | -71.263 | -75.406 | -77.592 | -74.817 | -73.105 | -73.971 | -76.56 |
| N4 | -77.963 | -73.561 | -66.035 | - | -66.035 | -78.815 | -74.949 | -69.231 | -61.553 | -66.424 | -78.861 | -75.406 | -71.263 | -68.653 | -71.263 | -80.271 | -77.592 | -74.817 | -73.105 | -73.971 |
| N5 | -81.086 | -77.963 | -73.561 | -66.035 | - | -81.693 | -78.815 | -74.949 | -69.231 | -61.553 | -81.61 | -78.861 | -75.406 | -71.263 | -68.653 | -82.597 | -80.271 | -77.592 | -74.817 | -73.105 |
| N6 | -61.553 | -69.231 | -74.949 | -78.815 | -81.693 | - | -66.035 | -73.561 | -77.963 | -81.086 | -61.553 | -69.231 | -74.949 | -78.815 | -81.693 | -68.653 | -71.263 | -75.406 | -78.861 | -81.61 |
| N7 | -66.424 | -61.553 | -69.231 | -74.949 | -78.815 | -66.035 | - | -66.035 | -73.561 | -77.963 | -66.424 | -61.553 | -69.231 | -74.949 | -78.815 | -71.263 | -68.653 | -71.263 | -75.406 | -78.861 |
| N8 | -73.153 | -66.424 | -61.553 | -69.231 | -74.949 | -73.561 | -66.035 | - | -66.035 | -73.561 | -73.153 | -66.424 | -61.553 | -69.231 | -74.949 | -75.406 | -71.263 | -68.653 | -71.263 | -75.406 |
| N9 | -77.554 | -73.153 | -66.424 | -61.553 | -69.231 | -77.963 | -73.561 | -66.035 | - | -66.035 | -77.554 | -73.153 | -66.424 | -61.553 | -69.231 | -78.861 | -75.406 | -71.263 | -68.653 | -71.263 |
| N10 | -80.73 | -77.554 | -73.153 | -66.424 | -61.553 | -81.086 | -77.963 | -73.561 | -66.035 | - | -80.73 | -77.554 | -73.153 | -66.424 | -61.553 | -81.61 | -78.861 | -75.406 | -71.263 | -68.653 |
| N11 | -68.653 | -71.263 | -75.406 | -78.861 | -81.61 | -61.553 | -66.424 | -73.153 | -77.554 | -80.73 | - | -66.035 | -73.561 | -77.963 | -81.086 | -61.553 | -66.424 | -73.153 | -77.554 | -80.73 |
| N12 | -71.263 | -68.653 | -71.263 | -75.406 | -78.861 | -69.231 | -61.553 | -66.424 | -73.153 | -77.554 | -66.035 | - | -66.035 | -73.561 | -77.963 | -69.231 | -61.553 | -66.424 | -73.153 | -77.554 |
| N13 | -75.406 | -71.263 | -68.653 | -71.263 | -75.406 | -74.949 | -69.231 | -61.553 | -66.424 | -73.153 | -73.561 | -66.035 | - | -66.035 | -73.561 | -74.949 | -69.231 | -61.553 | -66.424 | -73.153 |
| N14 | -78.861 | -75.406 | -71.263 | -68.653 | -71.263 | -78.815 | -74.949 | -69.231 | -61.553 | -66.424 | -77.963 | -73.561 | -66.035 | - | -66.035 | -78.815 | -74.949 | -69.231 | -61.553 | -66.424 |
| N15 | -81.61 | -78.861 | -75.406 | -71.263 | -68.653 | -81.693 | -78.815 | -74.949 | -69.231 | -61.553 | -81.086 | -77.963 | -73.561 | -66.035 | - | -81.693 | -78.815 | -74.949 | -69.231 | -61.553 |
| SERVER | -73.105 | -74.817 | -77.592 | -80.271 | -82.597 | -68.653 | -71.263 | -75.406 | -78.861 | -81.61 | -61.553 | -69.231 | -74.949 | -78.815 | -81.693 | - | -66.035 | -73.561 | -77.963 | -81.086 |
| N16 | -73.971 | -73.105 | -74.817 | -77.592 | -80.271 | -71.263 | -68.653 | -71.263 | -75.406 | -78.861 | -66.424 | -61.553 | -69.231 | -74.949 | -78.815 | -66.035 | - | -66.035 | -73.561 | -77.963 |
| N17 | -76.56 | -73.971 | -73.105 | -74.817 | -77.592 | -75.406 | -71.263 | -68.653 | -71.263 | -75.406 | -73.153 | -66.424 | -61.553 | -69.231 | -74.949 | -73.561 | -66.035 | - | -66.035 | -73.561 |
| N18 | -79.334 | -76.56 | -73.971 | -73.105 | -74.817 | -78.861 | -75.406 | -71.263 | -68.653 | -71.263 | -77.554 | -73.153 | -66.424 | -61.553 | -69.231 | -77.963 | -73.561 | -66.035 | - | -66.035 |
| N19 | -81.793 | -79.334 | -76.56 | -73.971 | -73.105 | -81.61 | -78.861 | -75.406 | -71.263 | -68.653 | -80.73 | -77.554 | -73.153 | -66.424 | -61.553 | -81.086 | -77.963 | -73.561 | -66.035 | - |

|  | N7 | N8 | N9 | N11 | N15 | SERVER | N18 |
|---|---|---|---|---|---|---|---|
| N7 | 0 | 1 | 0 | 1 | 0 | 0 | 0 |
| N8 | 1 | 0 | 1 | 0 | 0 | 0 | 0 |
| N9 | 0 | 1 | 0 | 0 | 1 | 0 | 1 |
| N11 | 1 | 0 | 0 | 0 | 0 | 1 | 0 |
| N15 | 0 | 0 | 1 | 0 | 0 | 0 | 1 |
| SERVER | 0 | 0 | 0 | 1 | 0 | 0 | 0 |
| N18 | 0 | 0 | 1 | 0 | 1 | 0 | 0 |

FIG.9

|  | N7 | N8 | N9 | N11 | N15 | SERVER | N18 | TOTAL |
|---|---|---|---|---|---|---|---|---|
| N1 | 1 | 0 | 0 | 1 | 0 | 0 | 0 | 2 |
| N2 | 1 | 1 | 0 | 0 | 0 | 0 | 0 | 2 |
| N3 | 1 | 1 | 1 | 0 | 0 | 0 | 0 | 3 |
| N4 | 0 | 1 | 1 | 0 | 0 | 0 | 0 | 2 |
| N5 | 0 | 0 | 1 | 0 | 1 | 0 | 0 | 2 |
| N6 | 1 | 0 | 0 | 1 | 0 | 1 | 0 | 3 |
| N10 | 0 | 0 | 1 | 0 | 1 | 0 | 0 | 2 |
| N12 | 1 | 1 | 0 | 1 | 0 | 1 | 0 | 4 |
| N13 | 1 | 1 | 1 | 0 | 0 | 0 | 1 | 4 |
| N14 | 0 | 1 | 1 | 0 | 1 | 0 | 1 | 4 |
| N16 | 1 | 0 | 0 | 1 | 0 | 1 | 0 | 3 |
| N17 | 0 | 1 | 0 | 0 | 0 | 0 | 1 | 2 |
| N19 | 0 | 0 | 0 | 0 | 1 | 0 | 1 | 2 |

DATA DISTRIBUTION SYSTEM, DISTRIBUTION DEVICE, TERMINAL DEVICE, AND DATA DISTRIBUTION METHOD PROVIDING ENHANCED COMMUNICATION EFFICIENCY

FIELD

The present invention relates to a data distribution system, a distribution device, a terminal device, and a data distribution method.

BACKGROUND

A technology referred to as a "sensor network" or a "machine to machine (M2M) network" has been and is being developed, in which an information terminal exchanges information or gives an instruction using a communication function. In such a network, a multi-hop communication technology such as typically ZigBee®, in which a terminal itself relays data, has been in practical use because it is easy to set up.

Operations to be performed using communication, for example, include uploading to a server of motion video obtained from a monitoring camera, downloading of content to a video display device placed in public locations, and automatic updating of software data held in an information terminal.

A system referred to as "digital signage" downloads advertising content and other data to a terminal (a digital-signage terminal). It is possible that this digital-signage system is realized by the multi-hop communication technology. In such an example, highly reliable communication is desired, and also as communication traffic increases, higher-efficiency communication is desired.

In multi-hop communication, a communication state at a relay target cannot be directly identified. Therefore, there is a possibility that communication cannot be performed due to a communication fault or other errors. When communication cannot be performed, a communication path is searched for. During the search for the communication path, communication is disconnected. Therefore, in order to perform highly reliable communication, ensuring a redundant path in advance has been proposed (see Patent Literature 1 listed below).

Meanwhile, in multi-hop communication, as a method for increasing the communication efficiency, the number of communication terminals is limited. With this method, a multi-hop network is managed hierarchically, and a communication path is constructed by communication terminals positioned at a higher hierarchy level. As a hierarchical management method, in hierarchical state routing (HSR) for example, an area is divided into several areas, and a representative node is located in each of the areas to reduce traffic for controlling a communication path and to therefore increase the communication efficiency (see Non Patent Literature 1 listed below).

CITATION LIST

Patent Literature

Patent Literature 1: Japanese Patent Application Laid-open No. 2011-146866

Non Patent Literature

Non Patent Literature 1: Iwata, A.; Ching-Chuan Chiang; Guangyu Pei; Gerla, M.; Tsu-WeiChen, "Scalable Routing Strategies for Ad Hoc Wireless Networks," Selected Areas in Communications, IEEE Journal on, vol. 17, no. 8, pp. 1369-1379, Aug. 1999

SUMMARY

Technical Problem

As described above, the multi-hop communication technology is an effective technology because the network is easy to set up. Improvements have been made to the multi-hop communication technology, for example, by means of constantly providing a redundant communication path to respond to communication stoppage and to therefore enhance communication stability or by means of establishing a hierarchy of communication devices to reduce the communication traffic and to therefore increase the communication efficiency.

However, according to the conventional technologies including the above examples, in the method to provide a redundant communication path in order to stabilize communication, improvements are not suggested from the viewpoint of increasing the communication efficiency. In the method to establish a hierarchy of communication devices to reduce the communication traffic, there are two problems as follows.

(1) When communication with a lower-level managed terminal is stopped because of a change in radio-communication environment, construction of a new path is required, which leads to inefficiency because during the construction, communication is stopped, and distribution itself needs to be restarted.

(2) Unless communication is scheduled when data is transmitted from a server or other devices at a higher hierarchy level to a terminal at a lower hierarchy level, this causes interference or a collision between different areas and the communication efficiency decreases. When prevention of a decrease in communication efficiency is attempted, this makes a communication-schedule management method more complicated.

The present invention has been achieved to solve the above problems, and an object of the present invention is to provide a data distribution system, a distribution device, a terminal device, and a data distribution method that can achieve both high reliability and high communication efficiency and that can relay and distribute data to many terminal devices.

Solution to Problem

In order to solve the above problems and achieve the object, an aspect of the present invention is a data distribution system that includes a distribution device that distributes data and a plurality of terminal devices that receive distribution of the data by radio communication, wherein the distribution device measures a communication status with each of the terminal devices, the terminal devices each measure a communication status with the distribution device and a communication status with each of other terminal devices and notify the distribution device of measurement results, the distribution device categorizes the terminal devices as a relay terminal that relays the data or as an end terminal that does not relay the data on a basis of the measurement results notified by the terminal devices and a communication status measured by the distribution device itself, notifies the terminal devices of a categorization result, selects a relay path through which it is possible to distribute the data to all the relay terminals by relaying the data between the relay terminals, notifies the terminal devices of the relay path, distributes the data to the relay terminal on the relay path with the smallest number of hops from the distribution device itself, instructs the corresponding relay terminal to distribute the data to the relay terminal on the relay path at a next hop, and subsequently instructs the relay terminal to distribute the data to the relay terminal at a next hop until the data is distributed to a last relay terminal on the relay path, and then instructs the last relay terminal on the relay path to distribute the data to the end terminal, and when the terminal device is notified by the distribution device that the terminal device itself is the relay terminal, the terminal device distributes the data, received from the distribution device or from the relay terminal at a previous hop, to the distribution device or the end terminal at a next hop in accordance with an instruction from the distribution device, and when the terminal device is notified by the distribution device that the terminal device itself is the end terminal, the terminal device receives the data distributed from the distribution device or the relay terminal.

Advantageous Effects of Invention

The data distribution system according to the present invention can attain an effect where both high reliability and high communication efficiency can be achieved and data can be relayed and distributed to many terminal devices.

BRIEF DESCRIPTION OF DRAWINGS

FIG. 5 is a diagram illustrating an example of position coordinates of the data distribution server and terminals according to the present embodiment.

FIG. 6 is a diagram illustrating expected values of average received power between communication devices.

FIG. 7 is a diagram illustrating an example of a table representing the presence or absence of connection relations.

FIG. 8 is a diagram illustrating an example of a scaled-down table representing a connection relation.

FIG. 9 is a diagram illustrating an example of a "branch"-"trunk" connection-relation table.

DESCRIPTION OF EMBODIMENTS

Exemplary embodiments of a data distribution system, a distribution device, a terminal device, and a data distribution method according to the present invention will be explained below in detail with reference to the accompanying drawings. The present invention is not limited to the embodiments.

Embodiment

Figure 1:
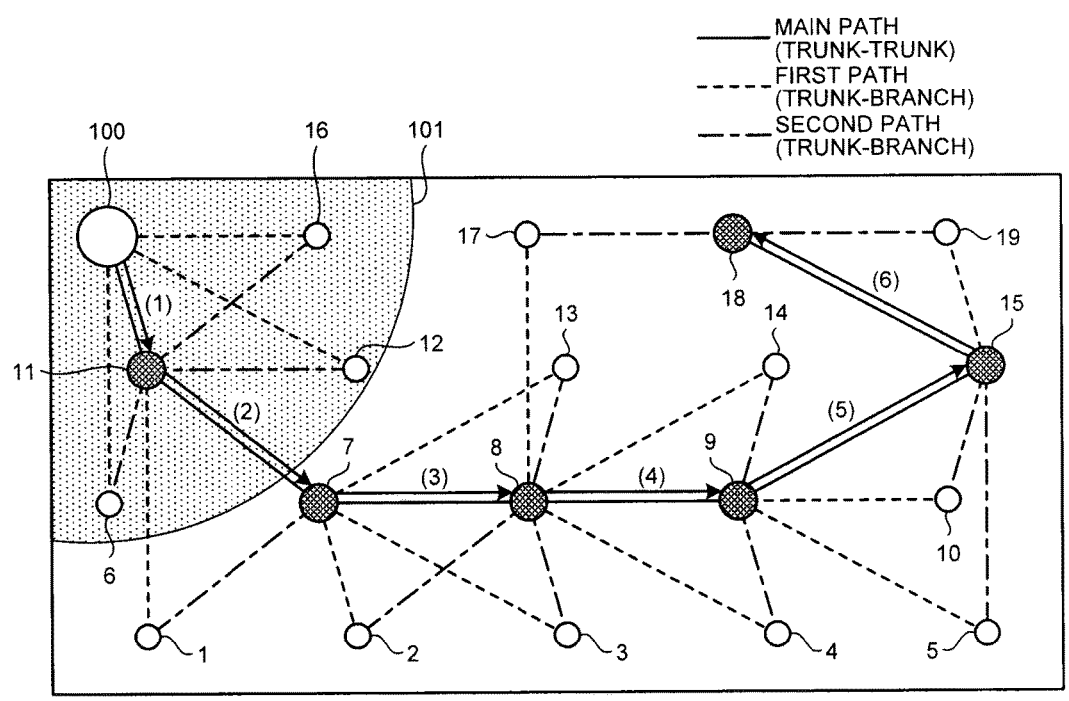
FIG. 1 is a diagram illustrating an example of the configuration of a data distribution system according to an embodiment of the present invention.

FIG. 1 is a diagram illustrating an example of the configuration of an embodiment of a data distribution system according to the present invention. As illustrated in FIG. 1, the data distribution system according to the present embodiment is configured from a data distribution server (distribution device) 100 and terminals (terminal devices) 1 to 19. While FIG. 1 illustrates 19 terminals as an example, the number of terminals is not limited thereto.

Figure 2:
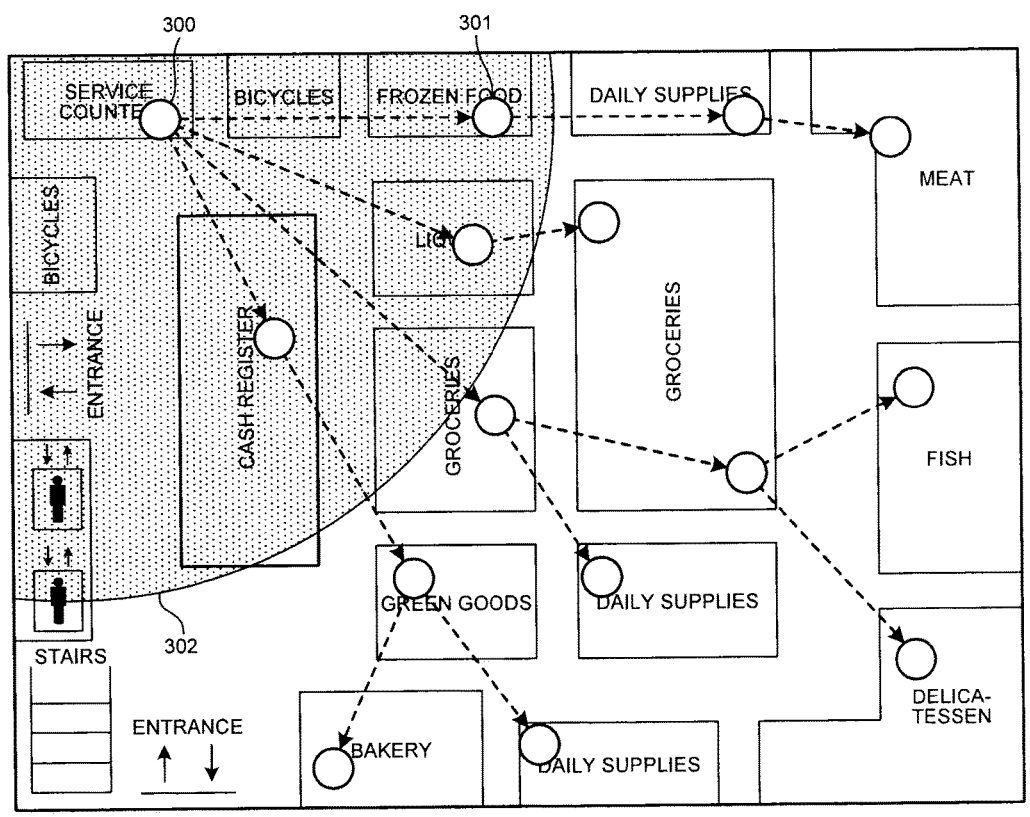
FIG. 2 is a diagram illustrating an example of a digital signage system.

The data distribution system according to the present embodiment is a digital signage system, for example, and distributes advertising content, software updates, and other data from the data distribution server to the terminals 1 to 19. FIG. 2 is a diagram illustrating an example of a digital signage system. FIG. 2 illustrates a digital signage system that is set up in a retail shop. A data distribution server 300 distributes advertising content, software updates, and other data to a digital signage terminal 301. In FIG. 2, for the sake of simplicity, only one digital signage terminal is designated with the reference numeral. However, all the circles, except the data distribution server 300, indicate digital signage terminals. In the case where multi-hop communication is not used, advertising content, software updates, and other data, distributed from the data distribution server 300 using a radio signal, can be distributed only within a communication area 302 of the data distribution server 300. In contrast to this, in the case where multi-hop communication is used, the digital signage terminals relay data; therefore, advertising content, software updates, and other data can also be distributed to the digital signage terminals outside the communication area 302.

The data distribution system according to the present embodiment can be applied to the digital signage system as illustrated in FIG. 2, for example. In the case where the data distribution system according to the present embodiment is applied to a digital signage system, the terminals 1 to 19 are digital signage terminals, and the data distribution server 100 is a data distribution server that distributes advertising content, software updates, and other data to the digital signage terminals. The data distribution system according to the present embodiment is not limited to the digital signage system, but is applicable to any system as long as the system distributes data to terminals using multi-hop communication.

Figure 3:
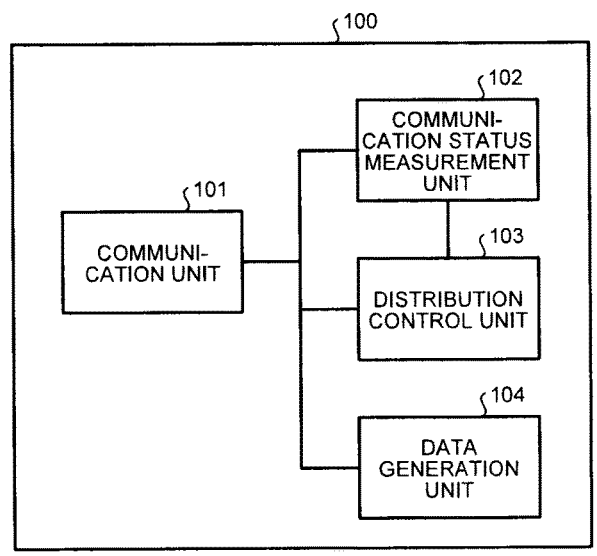
FIG. 3 is a diagram illustrating an example of the configuration of a data distribution server according to the embodiment.

FIG. 3 is a diagram illustrating an example of the configuration of the data distribution server 100 according to the present embodiment. As illustrated in FIG. 3, the data distribution server 100 according to the present embodiment includes a communication unit 101, a communication-status measurement unit 102, a distribution control unit 103, and a data generation unit 104. The communication unit 101 performs radio-communication transmission-reception processing. The communication-status measurement unit 102 measures the communication status with each of the terminals 1 to 19 as described later. The distribution control unit 103 determines, for example, a data-distribution path on the basis of the measurement results collected from the terminals 1 to 19 and on the basis of the measurement results from the communication-status measurement unit 102. The data generation unit 104 generates data to be distributed to the terminals 1 to 19.

Figure 4:
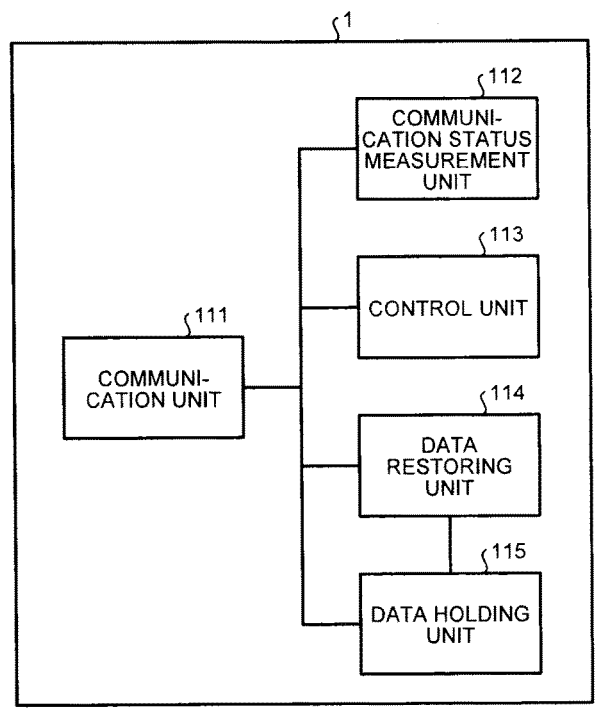
FIG. 4 is a diagram illustrating an example of the configuration of a terminal according to the embodiment.

FIG. 4 is a diagram illustrating an example of the configuration of the terminal 1 according to the present embodiment. The terminals 2 to 19 also have a configuration similar to the terminal 1. As illustrated in FIG. 4, the terminal 1 according to the present embodiment includes a communication unit 111, a communication-status measurement unit 112, a control unit 113, a data restoring unit 114, and a data holding unit 115. The communication unit 111 performs radio-communication transmission-reception processing.

The communication-status measurement unit 112 measures the communication status with each of the other communication devices that constitute the data distribution system. The control unit 113 controls whether to perform a relay operation when data is being distributed. The data holding unit 115 holds data distributed from the data distribution server 100. The data restoring unit 114 restores the data distributed from the data distribution server 100.

FIG. 5 is a diagram illustrating an example of the position coordinates of the data distribution server 100 and the terminals 1 to 19 according to the present embodiment. Hereinafter, in FIGS. 5 to 9, the data distribution server 100 is abbreviated to "server", and the terminals 1 to 19 are abbreviated to "N1 to N19", respectively. In FIG. 5, the X-axis is defined as the horizontal direction, the right side of the X-axis is defined as the positive direction, the Y-axis is defined as the vertical direction, and the upper side of the Y-axis is defined the positive direction. The Y coordinate of the terminal 1 is indicated as Y=0. The X coordinate of the data distribution server 100 is indicated as X=0.

FIG. 6 is a diagram illustrating expected values of average received power between communication devices (the data distribution server 100 and the terminals 1 to 19) when it is assumed that the data distribution server 100 and the terminals 1 to 19 are provided as illustrated in FIGS. 1 and 5. FIG. 6 illustrates expected average received power between terminals in the case where the transmitted power from each of the communication devices is equal and the distance is the only variable that contributes to power attenuation. In the table illustrated in FIG. 6, rows and columns represent the respective communication devices and the intersection between a row and a column represents expected average received power between the terminals.

Figure 7:
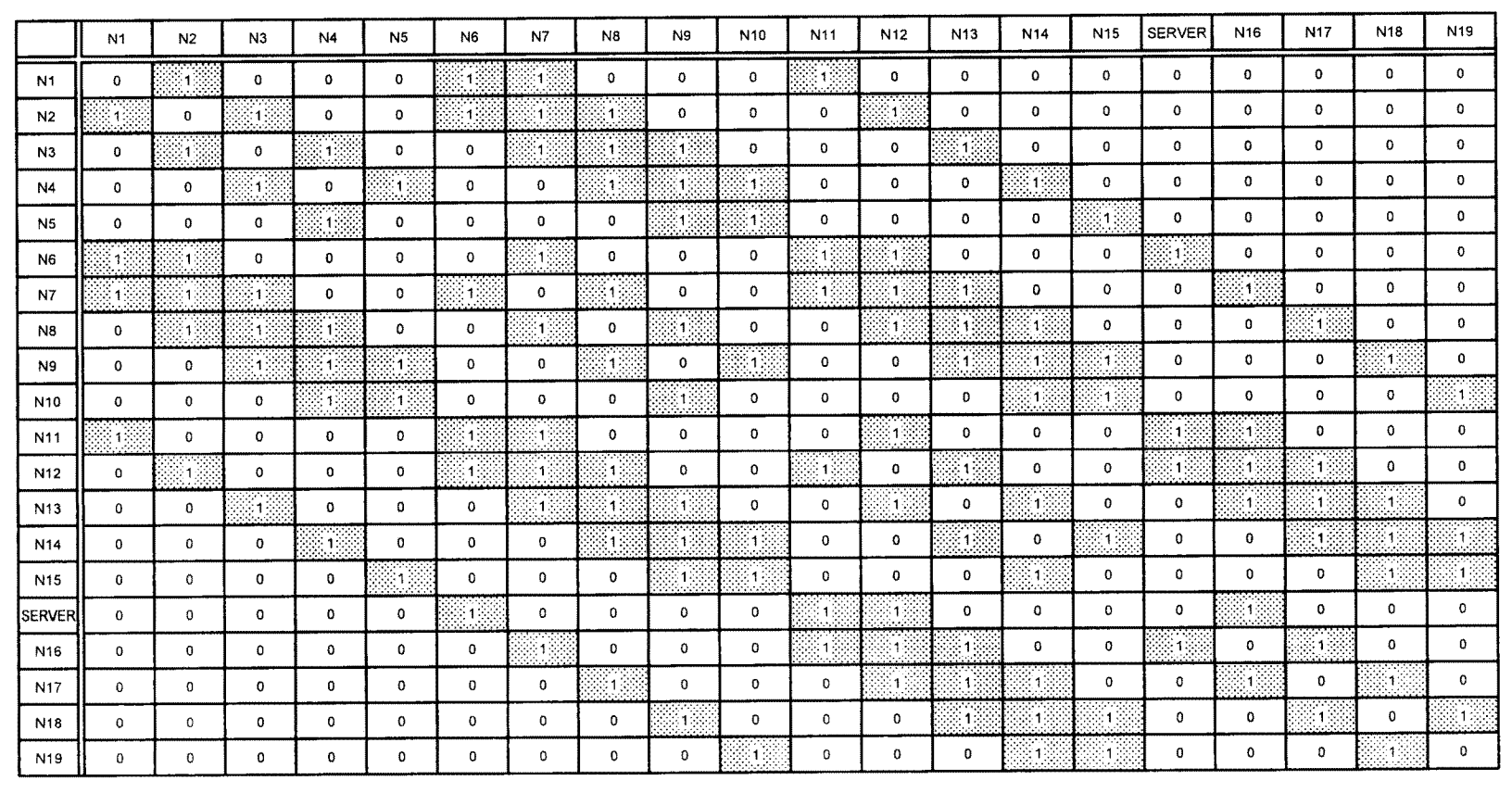

In the present embodiment, as an example, the case where the average received power is equal to or greater than a given threshold value is defined as stable communication (which is indicated by a color, by setting a threshold value of −70 dBm in this example). There is a connection relation when there is a stable communication relation. FIG. 7 is a diagram illustrating an example of a table representing the presence or absence of a connection relation. In FIG. 7, on the basis of the results in FIG. 6, "1" indicates a combination of communication devices with a connection relation (a combination of communication devices with average received power equal to or greater than the threshold value), and "0" indicates a combination of communication devices without a connection relation. In this example, average received power is used as an indicator for determining whether there is a stable communication relation. However, other indicators that indicate a communication state, such as a signal to noise ratio (SNR) or a packet error rate (PER), can also be used.

The data distribution server 100 that distributes data such as content and software updates, and the terminals 1 to 19 that receive the corresponding data, respectively measure the communication status with each of the other communication devices belonging to the data distribution system. Specifically, in the terminals 1 to 19, the communication-status measurement unit 112 measures the communication status, and in the data distribution server 100, the communication-status measurement unit 102 measures the communication status.

The data distribution server 100 collects the measurement results of the communication status from the terminals 1 to 19. The measurement results can be collected by means of transmitting a collecting instruction to each of the terminals 1 to 19 from the data distribution server 100 and transmitting the measurement results from each of the terminals 1 to 19 or by means of regularly transmitting the measurement results from each of the terminals 1 to 19, for example. Specifically, in the terminals 1 to 19, the communication unit 111 transmits the measurement results measured by the communication-status measurement unit 112, and in the data distribution server 100, the distribution control unit 103 receives the measurement results via the communication unit 101. It is also possible that the measurement result to be collected is original data before being processed, such as received-power log data, or is the processed result such as average received power obtained by averaging the received power or a comparative result obtained by comparing the average received power with a threshold value.

The distribution control unit 103 in the data distribution server 100 categorizes the terminals 1 to 19 as a "trunk" (relay terminal) that performs relay communication or a "branch" (end terminal) that does not perform relay communication on the basis of the collected measurement results and the measurement results from the communication-status measurement unit 102. Specifically, depending on, for example, the presence or absence of the connection relation illustrated in FIG. 7, the distribution control unit 103 extracts "trunks" that satisfy both the following conditions 1 and 2, selects "trunk" terminals in such a manner as to minimize the number of terminals extracted as "trunks", and categorizes terminals other than those selected as "trunks" as "branches".

Condition 1: "Trunks" are capable of communicating with each other through a relay ("trunks" perform a multi-hop relay therebetween; therefore, it is possible to distribute data from the data distribution server 100 to all the "trunks").

Condition 2: Each "branch" has a connection relation with two or more "trunks".

An example of a selection method in the case of selecting a "trunk" by a program is described below. However, any method can be used to obtain a set of "trunks" that satisfy the conditions 1 and 2. The actual calculation procedure in a program and its implementation method are not limited to the example illustrated below.

In the universal set S of communication devices (the terminal 1, the terminal 2, . . . , the terminal 19, and the data distribution server 100), sets T of communication devices that are "trunk" candidates and sets U=S−T of communication devices that are "branch" candidates are all calculated. While any calculation method can be employed, the number of "trunks" is incremented from 1, and a set T is defined for each number of "trunks" (for example, where the number of "trunks" is three, T=(the terminal 1, the terminal 2, and the data distribution server 100), T=(the terminal 1, the terminal 3, and the data distribution server 100), T=(the terminal 1, the terminal 4, and the data distribution server 100) . . . , T=(the terminal 2, the terminal 3, and the data distribution server 100) . . . ,). Because the data distribution server 100 is a data distribution source, it is also possible that the data distribution server 100 is exempt from categorization as a "trunk" or a "branch" and is always regarded as a "trunk" candidate.

The following examination processing is performed on all the calculated sets T. An example is illustrated, in which as one of the sets T, a set T=(the terminal 7, the terminal 8, the terminal 9, the terminal 11, the terminal 15, the data distribution server 110, and the terminal 18) is selected, and the examination processing is performed on this set T.

(A) Examination of Condition 1

The table in FIG. 7 is scaled down in such a manner that only combinations of communication devices selected as "trunk" candidates (constituent elements of the set T) remain in the rows and the columns. FIG. 8 is a diagram illustrating an example of a scaled-down table representing the connection relations. Terminals are extracted (the terminal 8 and the terminal 11 in the example in FIG. 8) that have a connection relation with a terminal in the first row in the table illustrated in FIG. 8 (the terminal 7 in the example in FIG. 8). The connection relation between the extracted terminals is referred to, and then it is determined that the terminal 8 and the terminal 11 have a connection relation. With this determination, it is determined that the terminal 7, the terminal 8, and the terminal 11 have a connection relation with each other; therefore, these terminals are regarded as connection-relation terminals.

In the above determination, when there are terminals that have been newly determined to be connection-relation terminals (the terminal 8 and the terminal 11 in this example), the row in the table in FIG. 8 corresponding to one of these terminals (the terminal 8 in this example) is referred to. When the corresponding terminal has a connection relation with a terminal that has not been determined as a connection-relation terminal, this terminal that has a connection relation with the corresponding terminal is determined to be a connection-relation terminal. In this example, the terminal 9 is added as a connection-relation terminal.

Furthermore, in the above determination, when there are terminals that have been newly determined to be connection-relation terminals (the terminal 9 in this example), the row in the table in FIG. 8 corresponding to one of these terminals (the terminal 9 in this example) is referred to. When the corresponding terminal has a connection relation with a terminal that has not been determined as a connection-relation terminal, this terminal that has a connection relation with the corresponding terminal is determined to be a connection-relation terminal. In this example, the terminal 15 and the terminal 18 are added as connection-relation terminals.

Further, in the above determination, when there are terminals that have newly been determined to be connection-relation terminals (the terminal 15 and the terminal 18 in this example), the row in the table in FIG. 8 corresponding to one of these terminals (the terminal 15 in this example) is referred to. When the corresponding terminal has a connection relation with a terminal that has not been determined as a connection-relation terminal, this terminal that has a connection relation with the corresponding terminal is determined to be a connection-relation terminal. In this example, in the determination regarding the terminal 15, a new terminal is not added as a connection-relation terminal. In the same manner as above, the row in the table in FIG. 8 corresponding to the terminal 18 is referred to, and when the corresponding terminal has a connection relation with a terminal that has not been determined as a connection-relation terminal, this terminal that has a connection relation with the corresponding terminal is determined to be a connection-relation terminal. In this example, in the determination regarding the terminal 18, a new terminal is not added as a connection-relation terminal.

In the same manner as above, the row in the table in FIG. 8 corresponding to the terminal 11 is referred to, and when the terminal 11 has a connection relation with a terminal that has not been determined as a connection-relation terminal, this terminal that has a connection relation with the terminal 11 is determined to be a connection-relation terminal. In this example, in the determination regarding the terminal 11, the data distribution server 100 is added as a connection-relation terminal. In the same manner as above, the row in the table in FIG. 8 corresponding to the data distribution server 100 is referred to, and when the data distribution server 100 has a connection relation with a terminal that has not been determined as a connection-relation terminal, this terminal that has a connection relation with the data distribution server 100 is determined to be a connection-relation terminal. However, a new terminal is not added as a connection-relation terminal.

In the manner as described above, for each of the terminals that have been determined as connection-relation terminals, it is determined whether the terminal has a connection relation with other terminals. When the number of new connection-relation terminals does not increase any further, the connection-relation terminal extraction processing ends. After the connection-relation terminal extraction processing, when the total number of communication devices that constitute the set T (seven communication devices in this example) is equal to the number of connection-relation terminals obtained by the extraction processing (seven connection-relation terminals in this example), it is determined by examination that the set T satisfies the condition 1. When both the numbers do not correspond to each other, the set T is excluded from a "trunk" candidate. After the above examination of the condition 1, examination of the condition 2 is performed on each of the sets T remaining as a candidate set of "trunks" in a manner as described below.

(B) Examination of Condition 2 (Examination of the Number of "Branch"-"Trunk" Connections)

Regarding the set T, on the basis of the connection-relation table illustrated as an example in FIG. 7, "branch" communication devices remain in the rows, "trunk" communication devices remain in the columns, and the other communication devices are removed from the connection-relation table to create a "branch"-"trunk" connection-relation table. FIG. 9 is a diagram illustrating an example of a "branch"-"trunk" connection-relation table.

By using the "branch"-"trunk" connection-relation table, the number of "trunks" each "branch" connects with (the number of connecting "trunks") is calculated. The table in FIG. 9 represents the number of connecting "trunks" in each row (for each "branch") as a total on the right-end column.

When the minimum value in the totals for respective "branches" obtained as described above (the number of connecting "trunks") is equal to or greater than 2, it is determined that the set T satisfies the condition 2. When the minimum value is less than 2, the set T is excluded from a candidate set of "trunks".

The above examinations of the conditions 1 and 2 are performed on all of subsets T in the universal set S of terminals. Some of the subsets T, which do not satisfy the conditions 1 and 2, are excluded from a candidate. The other subsets T, which satisfy the conditions 1 and 2, remain. Among the remaining subsets T, a subset T with the minimum number of "trunks" is eventually determined as a set of "trunks". In this example, the subset T=(the terminal 7, the terminal 8, the terminal 9, the terminal 11, the terminal 15, the data distribution server 100, and the terminal 18) is a set with the minimum number of "trunks". As described above, the distribution control unit 103 in the data distribution server 100 categorizes communication devices as a "trunk" or as a "branch", and notifies the terminals 1 to 19 of the categorization results. In the terminals 1 to 19, on the basis of this notification, the control unit 113 sets the device itself to be a "trunk" or a "branch". When the control unit 113 sets the device itself to be a "trunk", the control unit 113 holds data distributed directly or through a relay from the data distribution server 100 and distributes the data to the next "trunk" in accordance with an instruction from the data distribution server 100. When the control unit 113 sets the device itself to be a "branch", the control unit 113 receives the distributed data and does not relay the data to the next terminal.

FIG. 1 illustrates an example of paths with arrows in the case where the terminal 7, the terminal 8, the terminal 9, the terminal 11, the terminal 15, the data distribution server 100, and the terminal 18 are set as "trunks". A notification is made of a relay path between the "trunks" from the data distribution server 100 to each "trunk" terminal. Alternatively, it is also possible that the data distribution server 100 indicates a data distribution target to each "trunk" terminal. In FIG. 1, communication between "trunks" is illustrated as a main path with a solid line. Also, in communication between a "trunk" and a "branch", a path through which data is firstly distributed is illustrated as the first path with a dotted line, and a path through which data is secondly distributed is illustrated as the second path with a dot-and-dash line. Illustrations of the third and subsequent paths are omitted.

An actual data distributing procedure is described with reference to FIG. 1. The data distribution server 100 distributes data to the terminal 11 that serves as the first "trunk" ((1) in FIG. 1). In the terminal 11, the data holding unit 115 holds received data. In this example, the distribution method can be unicast communication including retransmission, or can be multicast communication, broadcast communication or other communication, in which retransmission and error correction are performed externally. The terminals 6, 12, and 16 that serve as "branches" and that have a connection relation with the data distribution server 100 receive data distributed from the data distribution server 100 within a receivable range.

Upon completion of the distribution to the terminal 11 that serves as the first "trunk", the data distribution server 100 instructs the terminal 11 to distribute the data to the terminal 7 that serves as the second "trunk". In the terminal 11, following the instruction, the data holding unit 115 transmits the data held therein via the communication unit 111 ((2) in FIG. 1). Communication between "trunk" terminals can also be unicast communication, multicast communication, or broadcast communication. The terminals 1, 6, 12, and 16 that serve as "branches" and that have a connection relation with the terminal 11 receive the data distributed from the terminal 11. In the case where data is transmitted by unicast, the terminals 1, 6, 12, and 16 that serve as "branches" are not set as targets. However, it is satisfactory if, upon receiving data addressed to a "trunk" terminal, the terminals 1, 6, 12, and 16 treat and process the data in the same manner as data addressed to the device itself.

Hereinafter, in the same manner as above, data is distributed between "trunk" terminals, that is, from the terminal 7 to the terminal 8 ((3) in FIG. 1), from the terminal 8 to the terminal 9 ((4) in FIG. 1), from the terminal 9 to the terminal 15 ((5) in FIG. 1), and from the terminal 15 to the terminal 18 ((6) in FIG. 1). The terminal 18 does not distribute the distributed data to another "trunk", but distributes the data to a neighboring "branch" terminal by broadcast communication or other communication. As described above, the data distribution server 100 sequentially instructs "trunk" terminals to distribute data in order starting from a distribution with the smallest number of hops from the data distribution server 100. A "branch" terminal receives data distributed from a "trunk" located within a receivable range. Some of the "branch" terminals receive identical distribution data from a plurality of terminals. Therefore, in a "branch" terminal, the data restoring unit 114 performs distributed-data restoring processing by removing an overlapping portion from received data and supplementing insufficient data. Insufficient data is supplemented by means of transmitting a retransmission request, for example.

In this example, the data distribution server 100 is set as a starting point, and data is distributed to the terminal 11, the terminal 7, the terminal 8, the terminal 9, the terminal 15, and the terminal 18 in the order that the terminals appear in this sentence. However, it is satisfactory if this data-distribution order (a communication path between "trunks") is determined on the basis of a connection relation between "trunks" illustrated as an example in FIG. 8.

A conventional technology can also be combined. For example, data is relayed to the terminal 18 at the ending point of the data distribution path between "trunks", and after distributing the data from the terminal 18, the data distribution server 100 or a "trunk" terminal checks the delivery to a "branch" terminal and retransmits insufficient data in accordance with the delivery checking.

Figure 10:
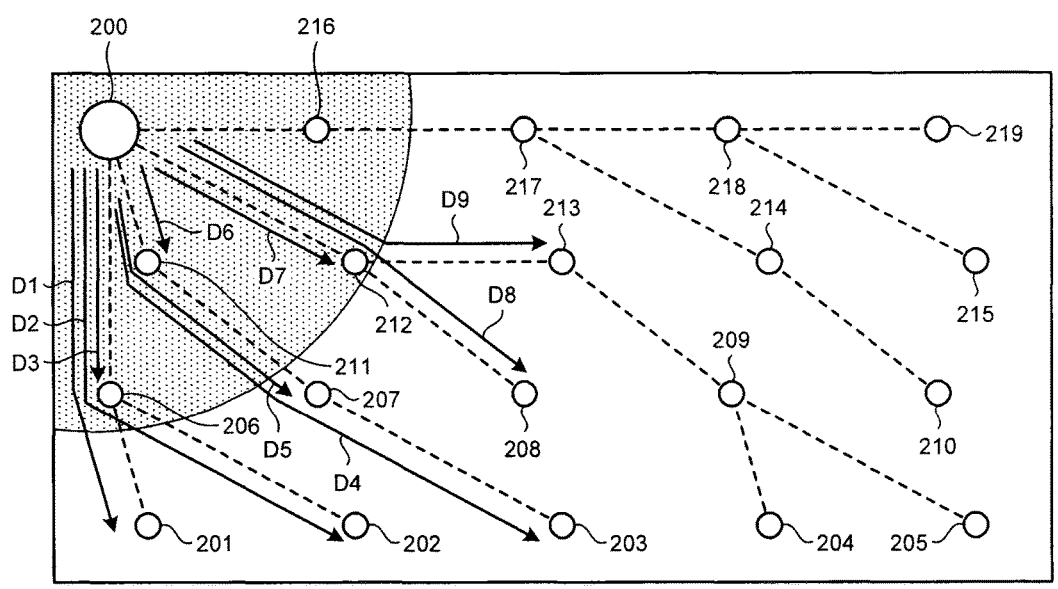
FIG. 10 is a diagram illustrating an example of data distribution according to a conventional simple multi-hop technology.

The number of links in a conventional simple multi-hop technology is compared with the number of links required for data distribution in the data distribution system according to the present embodiment. FIG. 10 is a diagram illustrating an example of data distribution according to a conventional simple multi-hop technology. FIG. 10 illustrates an example in which a conventional data distribution server 200 distributes data to terminals 201 to 219 using the simple multi-hop technology. The arrangement of the data distribution server 200 and the terminals 201 to 219 in FIG. 10 is similar to the arrangement of the data distribution server 100 and the terminals 1 to 19 in FIG. 1. Paths D1 to D9 represent data distribution paths. In the case with the conventional technology illustrated in FIG. 10, 48 links are used in total. In contrast, in the present embodiment illustrated in FIG. 1, overlapping paths can be omitted and thus the number of links can be reduced to six.

Assuming that each radio-communication link speed is made uniform at 5Mbps, under the conditions where the content size (data size) to be transmitted to each terminal is 100 MByte and where the same content is transmitted to each terminal, the distribution time in the conventional technology (FIG. 10) and in the present embodiment (FIG. 1) is calculated, and the calculated distribution time is as follows:

Conventional technology (FIG. 10): 48(links)×100 (MByte)×8 (bit)÷5(Mbps)÷3600(seconds)≅2.133(hours)≅2 hours and 8minutes The present embodiment (FIG. 1): 6 (links)×100 (MByte)×8(bit)÷5(Mbps)÷3600(seconds)≅0.2666(hour)≅16 minutes.

As described above, in the present embodiment, under the above conditions, it is possible to reduce the distribution time to one-eighth. This can be expected to lead to not only effective use of radio resources but also energy saving. Further, a stable communication path is provided and maintained. Even in the case such as where a communication status changes or a terminal is added or deleted, when "trunk" terminals satisfy the conditions 1 and 2, communication can be continued without resetting the data distribution path. For example, in the case where the terminal 6 that serves as a "branch" is incapable of communication due to a fault, there is no need to change the path in the present embodiment. However, in the conventional technology (corresponding to the case where the terminal 206 is incapable of communication due to a fault in FIG. 10), it is impossible to use two paths D1 and D2; therefore, setting of a new path is necessary.

As described above, in the present embodiment, the terminals 1 to 19 and the data distribution server 100 that constitute the data distribution system respectively measure the communication status with each of the other communication devices within the system, and the data distribution server 100 collects the measurement results. On the basis of the measurement results, the data distribution server 100 categorizes the terminals 1 to 19 as a "trunk" that relays data or as a "branch" that receives data, and notifies the terminals 1 to 19 of the categorization results. In the terminals 1 to 19, on the basis of the notification from the data distribution server 100, a "trunk" terminal distributes received data to the next "trunk" terminal in accordance with an instruction from the data distribution server 100. A "branch" terminal receives the data distributed from the "trunk" terminal. Therefore, high reliability and high communication efficiency can both be achieved.

INDUSTRIAL APPLICABILITY

As described above, the data distribution system, the distribution device, the terminal device, and the data distribution method according to the present invention are useful for a data distribution system performing multi-hop communication and are particularly suitable for a digital signage system.

REFERENCE SIGNS LIST 1 to 19, 201 to 219 terminal, 100, 200 data distribution server, 101, 111 communication unit, 102, 112 communication-status measurement unit, 103 distribution control unit, 104 data generation unit, 113 control unit, 114 data restoring unit, 115 data holding unit, D1 to D9 path.

The invention claimed is:

1. A data distribution system comprising:
a distribution device that distributes data; and
a plurality of terminal devices that receive distribution of the data by radio communication, wherein
the distribution device includes first circuitry configured to measure a communication status with each of the terminal devices,
the terminal devices each include second circuitry configured to measure a communication status with the distribution device and a communication status with each of other terminal devices and notify the distribution device of measurement results,
the first circuitry
categorizes the terminal devices as a relay terminal that relays the data or as an end terminal that does not relay the data on a basis of the measurement results notified by the terminal devices and a communication status measured by the distribution device itself,
selects the relay terminals such that it is possible to distribute the data to all the relay terminals by relaying the data between the relay terminals and possible for the end terminal to receive the data from two or more of the distribution device and the relay terminals,
identifies at least two relay terminals, or one relay terminal and the distribution device, that are connect to the end terminal,
notifies the terminal devices of a categorization result,
selects a relay path through which it is possible to distribute the data to all the relay terminals by relaying the data between the relay terminals, and
notifies the terminal devices of the relay path, and
the second circuitry distributes, when the terminal device is notified by the distribution device that the terminal device itself is the relay terminal, the data, received from the distribution device or from the relay terminal at a previous hop, to the distribution device or the end terminal at a next hop in accordance with an instruction from the distribution device.

2. A terminal device in the data distribution system according to claim 1 that includes the distribution device and a plurality of the terminal devices that receive distribution of the data by radio communication, the terminal device comprising:
circuitry configured to
measure a communication status with the distribution device and a communication status with each of other terminal devices,
notify the distribution device of the obtained measurement result,
execute, when the terminal device is notified by the distribution device that the terminal device itself is a relay terminal that relays data, a control to distribute the data, received from the distribution device or from the relay terminal at a previous hop on a relay path of the data notified by the distribution device, to the distribution device or an end terminal at a next hop in accordance with an instruction from the distribution device.

3. The terminal device according to claim 2 wherein, when the terminal device is notified by the distribution device that the terminal device itself is an end terminal that does not relay the data, the circuitry executes a control to receive the data distributed from the distribution device or the relay terminal.

4. The data distribution system according to claim 1, wherein the distribution device selects the relay terminals such that a number of the relay terminals is minimized.

5. The data distribution system according to claim 1, wherein the distribution device distributes the data to the relay terminal on the relay path at a next hop from the distribution device itself and instructs a corresponding relay terminal to distribute the data to the relay terminal on the relay path at a next hop from the corresponding relay terminal.

6. The data distribution system according to claim 5, wherein the distribution device instructs the relay terminal to distribute the data to the relay terminal at a next hop until the data is distributed to a last relay terminal on the relay path and then instructs the last relay terminal on the relay path to distribute the data to the end terminal.

7. The data distribution system according to claim 1, wherein, when the terminal device is notified by the distribution device that the terminal device itself is the end terminal, the terminal device receives the data distributed from the distribution device or the relay terminal.

8. The data distribution system of claim 1, wherein the distribution device is one of the relay terminals.

9. A distribution device that distributes data to a plurality of terminal devices by radio communication, the distribution device comprising:
circuitry configured to
measure a communication status with each of the terminal devices,
receive, from the terminal devices, a measurement result of a communication status with the distribution device and a communication status with other terminal devices, which are measured in the terminal devices, categorize the terminal devices as a relay terminal that relays the data or as an end terminal that does not relay the data on a basis of the measurement result notified by the terminal devices and a communication status measured by the distribution device itself, select the relay terminals such that it is possible to distribute the data to all the relay terminals by relaying the data between the relay terminals and possible for the end terminal to receive the data from two or more of the distribution device and the relay terminals, identify at least two relay terminals, or one relay terminal and the distribution device, that are connect to the end terminal, notify the terminal devices of a categorization result, select a relay path through which it is possible to distribute the data to all the relay terminals by relaying the data between the relay terminals, and notify the terminal devices of the relay path.

10. The distribution device according to claim 9, wherein the circuitry distributes the data to the relay terminal on the relay path at a next hop from the distribution device itself and instructs a corresponding relay terminal to distribute the data to the relay terminal on the relay path at a next hop from the corresponding relay terminal.

11. The distribution device according to claim 10, wherein the circuitry instructs the relay terminal to distribute the data to the relay terminal at a next hop until the data is distributed to a last relay terminal on the relay path and instructs the last relay terminal on the relay path to distribute the data to the end terminal.

12. A data distribution method in a data distribution system including a distribution device that distributes data and a plurality of terminal devices that receive distribution of the data by radio communication, the data distribution method comprising:

measuring, by the distribution device, a communication status with each of the terminal devices;

measuring, by the terminal devices, a communication status with the distribution device and a communication status with each of other terminal devices and notifying the distribution device of measurement results;

categorizing, via circuitry of the distribution device, the terminal devices as a relay terminal that relays the data or as an end terminal that does not relay the data on a basis of the measurement results notified at the second measuring and a communication status measured at the first measuring;

selecting the relay terminals such that it is possible to distribute the data to all the relay terminals by relaying the data between the relay terminals and possible for the end terminal to receive the data from two or more of the distribution device and the relay terminals;

identifying at least two relay terminals, or one relay terminal and the distribution device, that are connect to the end terminal, notifying the terminal devices of a categorization result;

selecting, by the distribution device, a relay path through which it is possible to distribute the data to all the relay terminals by relaying the data between the relay terminals;

notifying the terminal devices of the relay path; and distributing, by the terminal devices, the data, received from the distribution device or from the relay terminal at a previous hop, to the distribution device or the end terminal at a next hop in accordance with an instruction from the distribution device when the terminal device is notified by the distribution device that the terminal device itself is the relay terminal.

13. The data distribution method according to claim 12, further comprising:

distributing, by the distribution device, the data to the relay terminal on the relay path at a next hop from the distribution device itself and instructing a corresponding relay terminal to distribute the data to the relay terminal on the relay path at a next hop from the corresponding relay terminal.

14. The data distribution method according to claim 13, further comprising:

instructing, by the distribution device, the relay terminal to distribute the data to the relay terminal at a next hop until the data is distributed to a last relay terminal on the relay path and then instructing the last relay terminal on the relay path to distribute the data to the end terminal.

15. The data distribution method according to claim 12, further comprising:

receiving, by the terminal devices, the data distributed from the distribution device or the relay terminal when the terminal device is notified by the distribution device that the terminal device itself is the end terminal.

* * * * *